Figure 1:
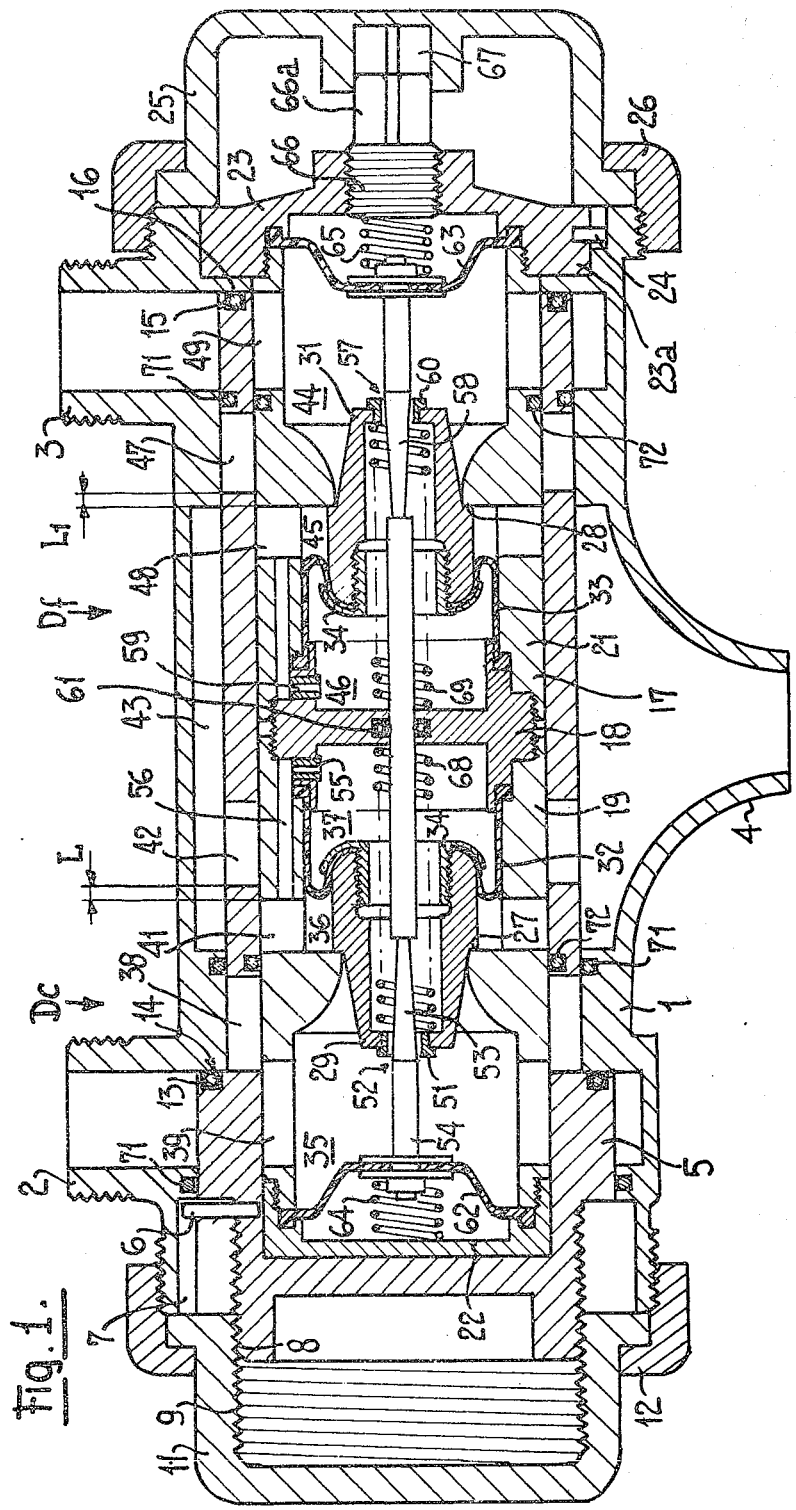

United States Patent [19]

Labarre

[11] 3,896,836
[45] July 29, 1975

[54] HOT AND COLD WATER MIXING DEVICE
[75] Inventor: Claude Labarre, Vernier, Switzerland
[73] Assignee: Kugler Fonderie et Robinetterie S.A., Geneva, Switzerland
[22] Filed: Sept. 27, 1973
[21] Appl. No.: 401,361

[30] Foreign Application Priority Data
Oct. 4, 1972 Switzerland.................. 14467/72

[52] U.S. Cl.................. 137/98; 137/604; 137/607; 236/12 R
[51] Int. Cl....................... G05d 11/02; G05d 23/13
[58] Field of Search........ 137/88, 98, 99, 100, 111, 137/489.5, 602, 604, 606, 607, 597; 236/12 R

[56] References Cited
UNITED STATES PATENTS

| 2,308,127 | 1/1943 | Symmons | 137/99 |
| 2,657,860 | 11/1953 | Schmidt et al. | 137/99 |
| 3,099,996 | 8/1963 | Symmons | 137/98 |
| 3,112,879 | 12/1963 | Killias | 236/12 R |
| 3,116,748 | 1/1964 | Wasson | 137/98 |
| 3,388,861 | 6/1968 | Harding | 236/12 R |
| 3,448,755 | 6/1969 | Symmons | 137/100 |
| 3,561,481 | 2/1971 | Taplin | 236/12 R |
| 3,584,784 | 6/1971 | Burhop | 236/12 R |

Primary Examiner—Martin P. Schwadron
Assistant Examiner—George L. Walton
Attorney, Agent, or Firm—Kurt Kelman

[57] ABSTRACT

A mixing device for hot and cold water comprises hot and cold water distributors. Each distributor includes a valve, a membrane supporting the valve, a seat whereon the membrane supports the valve, the valve seat being arranged between an upstream and a downstream chamber, and the membrane delimiting a counter-pressure chamber. A nozzle is mounted for movement with the valve, and an axially movable tapering central rod passes through the nozzle and defines therewith a variable passage in communication with the upstream chamber and with a feed opening in the membrane for interconnecting the upstream and counter-pressure chambers. A compensating piston is mounted in the upstream chamber and biases the rod for axial movement under the pressure prevailing in the upstream chamber.

10 Claims, 2 Drawing Figures

HOT AND COLD WATER MIXING DEVICE

The present invention relates to improvements in devices for mixing hot and cold water.

Devices of this type are known to include a hot water and a cold water distributor, each distributor including a valve, a membrane supporting the valve, and a seat whereon the membrane supports the valve. The valve seat is arranged between an upstream and a downstream chamber, and the membrane delimits or defines a counter-pressure chamber. A nozzle is mounted for movement with the valve, and a tapering central rod passes through the nozzle and defines therewith a variable passage in communication with the upstream chamber and with a feed opening in the membrane for interconnecting the upstream and counter-pressure chambers.

Due to the conical shape of the tapering rod, the feed opening grows proportional to the degree of opening of the valve, which assumes a position of equilibrium in the course of its opening movement as a consequence of the increased feeding of water into the counter-pressure chamber which, on the other hand, is constantly emptied through an outlet port whose section may be constant or variable. In known water mixers of this type, the outlet port section may be controlled, for example, by a thermostatic device responsive to the temperature of the hot and cold water mixture.

A major disadvantage of such known mixing devices resides in the fact that the proportions of cold and hot water in the mixture, i.e., the temperature of the mixture, is always more or less influenced by the pressure variations in the water input to the device. Thus, in bathroom installations in apartment houses, the water feed pressure may vary significantly in dependence on the number of bathrooms in use, i.e., how many faucets are open at any one time. Disequilibriums are, therefore, produced, causing temperature variations in the water mixtures received. Such variations persist in mechanical mixers and are only partly and belatedly compensated in thermostatically controlled mixers.

It is the primary object of this invention to overcome this disadvantage in mechanical and thermostatic mixers and to make the mixing devices practically independent of variations in the feed pressure of the hot and cold water streams delivered thereto for mixing.

The above and other objects of the invention are accomplished by making the central rod axially movable and providing a compensating piston mounted in the upstream chamber and biasing the rod for axial movement under the pressure prevailing in the upstream chamber.

Figure 2:
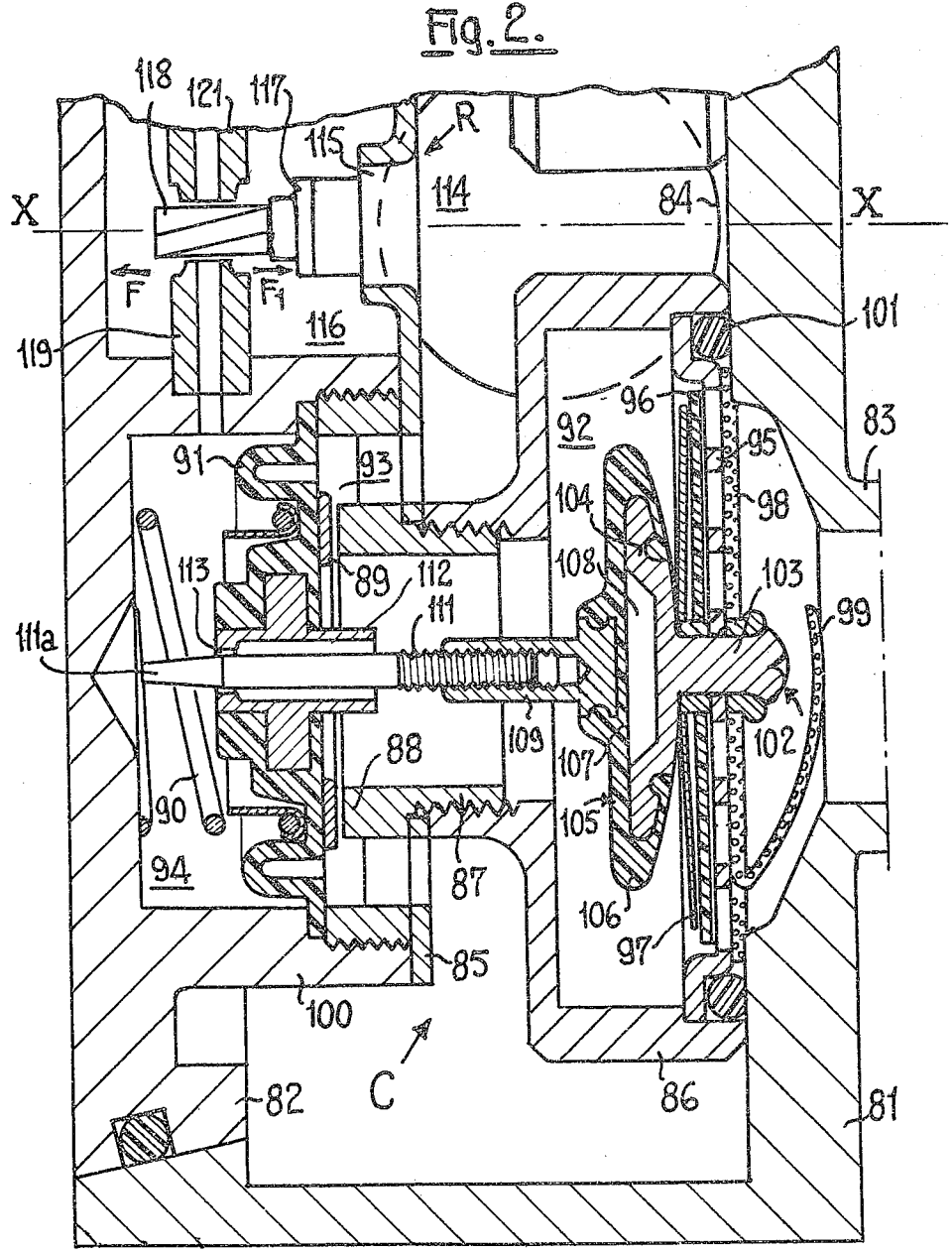

The above and other objects, advantages and features of the present invention will be better understood from the following detailed description of two now preferred embodiments thereof, taken in conjunction with the accompanying drawing wherein FIG. 1 is a longitudinal section of a mechanical mixing device according to this invention, and FIG. 2 is a partial view, in section, of a thermostatic mixing device according to the invention.

Referring now to the drawing and first to FIG. 1, there is shown a tubular body 1 having a hot water inlet 2, a cold water inlet 3 and an outlet 4 for the mixture of hot and cold water. Faucet pipe 5 is axially movably mounted in the bore of tubular body 1. The faucet pipe is held in the tubular body against rotation by pin 6 engaged in axially extending slot 7 of body 1, thus permitting axial movement of the pipe in respect of the body without rotation of the pipe in the body.

As seen in FIG. 1, the left end 8 of faucet pipe 5 is threaded and carries a rotatable operating button 11 whose interior thread 9 engages the threads 8 of the faucet pipe. The operating button is axially retained on tubular body 1 by nut 12. Operating button 11 permits the output of the hot and cold water mixture to be regulated by axial displacement of faucet pipe 5 in respect of tubular body 1. In the closed position illustrated in FIG. 1, the faucet pipe has been axially displaced until gasket 13 carried by the faucet pipe sealingly cooperates with adjacent bearing surface 14 of body 1 to cut off feeding of hot water through inlet 2 while gasket 15, which is also carried by the faucet pipe, sealingly cooperates with bearing surface 16 of body 1 to cut off feeding of cold water through inlet 3. The gaskets and cooperating bearing surfaces constitute primary water cut-off means.

Annular core 17 is positioned in the interior of faucet pipe 5 and is constituted by a plurality of components screwed together into a single assembly. Thus, two like casings 19, 21 are screwed onto a central core piece 18. Casing 19 is capped by bottom member 22 screwed onto the outer end of the casing. The outer end of casing 21 is screwed into a bottom member 23 which has a peripheral flange 23a positioned in a shoulder of tubular body 1. Pin 24 extends from the peripheral flange into an axial groove in tubular body 1 to prevent the bottom member 23 from rotating in the body and operating button cap 25 is held on body 1 by nut 26 which prevents axial displacement of assembled core 17 in respect of body 1.

Casing 19 and 21 have interior seats 27 and 28 whereon there are supported, respectively, valves 29 and 31 of two like distributors Dc for hot water and Df for cold water. The valves are supported on their seats by annular membranes 32 and 33 whose peripheral flanges are wedged tightly between central piece 18 and casings 19, 21 of the core. The interior flanges of the annular membranes, each of which has a central water feed opening, are fixed to valves 29 and 31 by screw caps 34.

Casing 19 defines upstream chamber 35 and downstream chamber 36 on respective sides of valve seat 27 of the hot water distributor valve 29 while membrane 32 defines counter-pressure chamber 37 behind the valve downstream of the downstream chamber.

When operating button 11 is turned to displace faucet pipe 5 axially in respect of tubular body 1 (to the left, as seen in FIG. 1), hot water will be fed from inlet 2 into upstream distributor chamber 35 through aligned orifices or ports 38 in faucet pipe 5 and 39 in core casing 19.

Core casing 19 also defines ports 41 arranged for alignment with outlet ports 42 in faucet pipe 5 upon axial displacement of the faucet pipe so as to establish communication between downstream chamber 36 of the hot water distributor and mixing chamber 43 which is in communication with the outlet 4.

Similarly, core casing 21 defines upstream chamber 44 and downstream chamber 45 on respective sides of valve seat 28 of the cold water distributor valve 31 while membrane 33 defines counter-pressure chamber 46 behind the valve downstream of the downstream chamber.

Also, core casing 21 defines ports 48 arranged for alignment with outlet ports 47 in faucet pipe 5 upon axial displacement of the faucet pipe so as to establish communication between downstream chamber 45 of the cold water distributor and mixing chamber 43. The core casing also has ports 49 permitting the upstream chamber 44 to be placed in communication with cold water inlet 3 when the operating button 11 is turned for axial displacement of the faucet pipe from its closed to its open position.

Water feed opening 52 places upstream chamber 35 of the hot water distributor in communication with its counter-pressure chamber 37. This opening is constituted by an annular passage between a conically tapering portion 53 of central rod 54 and nozzle 51, through which the rod passes, the nozzle being mounted on valve 29 for movement therewith, and the central opening in membrane 32. The counter-pressure chamber is also in communication with downstream chamber 36 by means of a calibrated outlet channel 55 leading to bore 56 in core casing 19, the bore opening into port 41 leading into chamber 36.

Similarly, water feed opening 57 places upstream chamber 44 of the cold water distributor in communication with its counter-pressure chamber 46. This opening is also constituted by an annular passage between conically tapering portion 58 of the central rod and nozzle 60, through which the rod passes, the nozzle being mounted on valve 31 for movement therewith, and the central opening in membrame 33. The counter-pressure chamber is also in communication with downstream chamber 45 by means of a calibrated outlet channel 59 leading to a bore in core casing 21, the bore opening into port 48 leading into chamber 45.

In the illustrated embodiment, the two distributors are arranged coaxially and a single element constitutes the central rods of the two distributors in coaxial alignment. This single element is axially movable, as will be explained hereinafter, and is journaled in an axial bore in a dividing wall of central core component 18, gasket 61 providing a fluid-tight mounting for the element 54 to prevent any passage of water between chambers 37 and 46 of the two distributors, which are separated by the dividing wall of the central core component 18.

In accordance with the present invention, compensating pistons 62 and 63 are fixed to the respective ends of central rod element 54, these pistons being constituted by deformable membranes forming the bottoms of the respective upstream chambers 35 and 44. The ends of the rod element are affixed to the central portions of the membranes 62 and 63.

Resilient means consisting of compression springs 64 and 65 are mounted behind the compensating pistons, spring 64 being supported by bottom member 22 of core casing 19 while adjustable abutment 66 supports spring 65. The adjustable abutment is threadedly mounted in bottom member 23 and has a polygonal extension 66a engaged in a polygonal bore 67 in operating button 25. In this manner, turning of button 25 will axially displace abutment 66 and this axially displaces central rod element 54 in one direction or the other, depending on the direction of rotation of button 25, causing springs 64 and 65 to be simultaneously compressed more or less. The springs are biased in opposite directions.

Weak springs 68 and 69 are mounted on rod element 54 adjacent the central dividing wall of the device and tend to hold valves 29 and 31 on their respective seats.

Gaskets 71 assure fluid tightness between tubular body 1 and faucet pipe 5 while like gaskets 72 fulfill the same function between the axially movable faucet pipe and the fixed core.

The above-described mixing device operates as follows:

In the closed position shown in FIG. 1, neither hot nor cold water will flow into the mixing device through inlets 2 and 3 since gaskets 13, 15 of faucet pipe 5 will prevent water from entering. The water sources are thus closed off upstream of the mixing device. When it is desired to receive a hot and cold water mixture through outlet 4, operating button 11 is turned to displace the faucet pipe so as to disengage gasket 13, 15 from bearing surfaces 14, 16, i.e., by moving the pipe slightly to the left, as seen in FIG. 1. Opening of gasket 13 precedes that of outlet port 42 because of the dead stroke L between the adjacent edges of ports 41 and 42. Therefore, upstream chamber 35, downstream chamber 36 and counter-pressure chamber 37 all will be filled with hot water at the pressure at which the hot water is received through inlet 2 from the hot water source. Similarly, opening of gasket 15 precedes that of outlet port 47 because of dead stroke $L_1$ between adjacent edges of ports 47 and 48, gaskets 13 and 15 being opened simultaneously to permit upstream chamber 44, downstream chamber 45 and counter-pressure chamber 46 to be filled with cold water at the pressure at which the cold water is received through inlet 3 from the cold water source, these chambers being filled with hot and cold water at the prevailing water pressures before any water can move out into mixing chamber 43 through the outlet ports.

Upon further rotation of operating button 11 in the opening direction, outlet ports 41, 42 and 47, 48 will begin to register so as to permit growing amounts of hot and cold water to enter into mixing chamber 43 whence a mixture of hot and cold water is discharged through outlet 4, the registered outlet openings for the hot and cold water remaining identical during the rotation of the button and increasing simultaneously as the faucet pipe is displaced axially towards the left (as seen in FIG. 1).

Once ports 41 and 42 for the distributor Dc of hot water are in complete alignment, i.e., completely open, the distributor operates as follows:

As the hot water flows out of downstream chamber 36 through outlet ports 41 and 42, the pressure in this chamber will decrease, causing a like decrease in pressure in counter-pressure chamber 37 which tends to be emptied into downstream chamber 36 through calibrated channel 55. Thus, the higher pressure in upstream chamber 35 will force valve 29 to be lifted off its seat 27, thus permitting water to flow from chamber 35 into chamber 36.

As valve 29 is axially displaced towards the right, as seen in FIG. 1, inlet opening 52 will become progressively larger, due to the conically tapering shape of rod portion 53 passing through nozzle 51, until the valve attains a position of equilibrium at the point when sufficient water has been fed through opening 52 into counter-pressure chamber 37 to compensate for the loss of water from this chamber through channel 55, i.e., until sufficient pressure has been built up on the counter-pressure chamber to prevent further rightward movement of valve 29. In this manner, the valve operates as a pressure regulator or control to produce a stable reduced pressure in downstream chamber 36 and, thus, a hot water output determined by the extent of the opening provided by registering outlet ports 41, 42. The amount of the reduced pressure established in the downstream chamber depends, however, on the axial position of central rod 54 which determines, due to the conicity of rod portion 53, the variable size of annular opening 52. When the rod is displaced leftwards (as seen in FIG. 1), the opening size increases so that the valve will find its position of equilibrium after a lesser lifting off its seat which will cause a lowering of the pressure in downstream chamber 36 and a smaller flow of hot water through registering ports 41, 42. Such a leftward displacement of central rod 54 simultaneously causes the size of opening 52 to increase and that of opening 57 of the cold water distributor to decrease. This decrease will cause cold water pressure to build up in upstream chamber 44, forcing valve 31 to be lifted off its seat 28 and cold water to flow through the opened valve into downstream chamber 45 whence an increased amount of cold water will flow through registering outlet ports 47, 48, the amount of outflowing cold water being larger than that of hot water flowing out through ports 41, 42 although the sections of registering ports 41, 42 and 47, 48 are the same.

In this manner, rotation of operating button 25, which produces the axial displacement of central rod 54, makes it possible to vary the respective outputs of hot and cold water, i.e., the temperature of the water mixture discharged from the mixing device. This axial displacement of rod 54 also results in a change in the bias of springs 64 and 65, due to the changing pressure exerted upon spring 65 by abutment 66 as the latter is axially moved by the rotation of button 25.

When the water pressures are the same in upstream chambers 35 and 44 of the hot and cold water distributors, which pressures are proportional to the pressures prevailing in water inlets 2 and 3, respectively, the pressures exerted upon compensating pistons or membranes 62 and 63 are also the same and are in equilibrium. In this state of equilibrium, the compensating membranes have no effect on the axial position of central rod 54.

However, when the hot water pressure in upstream chamber 35 falls markedly while the cold water pressure in upstream chamber 44 remains substantially unchanged, the force exerted upon membrane 62 will be reduced while that exerted upon membrane 63 will remain unchanged. Therefore, spring 64 will push central rod 54 to the right, as seen in FIG. 1, to attain a new position of equilibrium resulting from the now smaller compression or bias of spring 64 and the increased compression of spring 65.

This axial displacement of central rod 54 causes a reduction in the size of opening 52 of the hot water distributor and a concomitant increase in the size of opening 57 of the cold water distributor. This, in turn, causes a corresponding displacement of the distributor valves, the hot water valve 29 being opened wider to find its equilibrium position while the cold water valve 31 moves towards a closing position. Thus, the loss of hot water delivery will decrease in the same measure as it will increase for the cold water delivery so that the water pressures in downstream chambers 36 and 46 will maintain the same proportion despite the difference in the water pressures in upstream chambers 35 and 44. In this way, the piston arrangement provides a compensation for differences in hot and cold water pressures delivered to the mixing device, always maintaining the same relation between the hot and cold water outputs from the device, regardless of the input pressures. Therefore, the constancy of the water temperature at mixing device outlet 4 is assured.

Since a single central rod 54 is common to the hot and cold water distributors, inverse compensation is effected simultaneously for the hot and cold water valves so that the mixing device is practically insensitive to variations in the water delivery pressure even if the same are substantial, i.e., in the range of one to six atmospheres.

The advantages of the described arrangement will partially be obvious from the above description and may be summarized as follows:

1. In its closed position, i.e., when there is no water output from the mixing device, the water cut-off is produced by gaskets 13 and 15 upstream of the mixing device, which prevents any passage of water from one line to the other. On the other hand, when the mixing device is in the operating position, the water output is determined by the extent of opening between registering outlet ports 41, 42 (for hot water) and 47, 48 (for cold water). In this manner, substantially all unfavorable dynamic effects caused by the direct control of the water output by the mixing device valves are eliminated.

2. The bore of tubular mixing device body 1 has only two axial bearing surfaces or shoulders 14 and 16, which makes its manufacture very easy. It will be noted that faucet pipe 5, too, has a cylindrical interior surface throughout its length and has only a single exterior bearing surface or shoulder. Removal of nut 26 enables the mixing device core 17 to be moved out of the faucet pipe without having to disassemble the pipe while removal of nut 12 makes it possible to remove the faucet pipe without having to disassemble the core. This structure makes manufacture, assembly and maintenance very simple.

3. The pressure compensating piston arrangement 62, 63 assures satisfactory operation of the mixing device despite substantial variations in the water feed pressures.

4. Control of the water output by the outlet ports downstream of the hot and cold water distributors enables the pressure to be maintained therein and permits stable operation even for very different outputs.

5. The coaxial arrangement of the two distributors and their opposite operation permits a very compact construction involving a minimum number of parts.

A second embodiment of the present invention is shown in FIG. 2 illustrating a hot and cold water mixing device which is thermostatically controlled, i.e., which includes a control element responsive to the temperature of the discharged water mixture to determine the output of hot and cold water so as to maintain the temperature of the water mixture constant despite possible variations in the temperature of the hot water delivered to the mixing device.

Such a mixing device comprises two identical distributors respectively controlling the output of hot and cold water, and a thermostatic control means responsive to the temperature of the water mixture discharged from the device and controlling the two distributors.

For the sake of simplicity, FIG. 2 shows only hot water distributor C and thermostatic control R, the cold water distributor (not shown) being disposed symmetrically in respect of hot water distributor C on the other side of central axis X—X of the mixing device.

The illustrated mixing device comprises a casing 81 covered water-tightly by a closure 82. Casing 81 has a hot water inlet 83 leading to the hot water distributor and, symmetrically arranged in respect of central axis X—X and not shown, a like cold water inlet leading to the non-illustrated cold water distributor. A water mixture outlet 84 leads from the casing intermediate the water inlets, the water flow arrangement being substantially equivalent to that of tubular body 1, with its inlets 2 and 3 and outlet 4, in the embodiment of FIG. 1.

Casing closure 82 has two bosses 100 disposed in front of the water inlets and supporting plate 85.

The distributor comprises a concave body 86, whose concavity defines upstream chamber 92 facing the water inlet, body 86 being screwed onto collar 87 supported by plate 85. The collar has an annular seat 88 for valve 89 supported by rubber membrane 91. The valve and its seat separate upstream chamber 92 from downstream chamber 93, the rubber membrane defining counter-pressure chamber 94 with bosses 100 adjacent to the downstream chamber. Compression spring 90 in the counter-pressure chamber is biased to maintain the valve on its seat, i.e., closed.

Perforated plate 95 is placed over the upstream chamber on concave body 86, a water-tight gasket 101 being placed between the peripheral flange of plate 95 and casing 81, mushroom-shaped element 102 being supported coaxially on plate 95 in alignment with water inlet 83. Plate 95 also supports a stop valve constituted by rubber disc 96 maintained in position by star-shaped spring 97 retained between disc 96 and element 104. Water filter 98 is disposed on plate 95 upstream of the stop valve, the filter being constituted by a metal grating washer having a tab 99 to enable the same to be lifted off its support plate for cleaning purposes.

Mushroom-shaped element 102 comprises stem 103 rivetted to plate 95 and concave head 104 carrying rubber membrane 105 having a hollow peripheral flange 106 mounted on concave head 104 and covering its concavity with its portion 107 which is deformable. This deformable central portion of the membrane carries an internally threaded element 109 into which is screwed a threaded end of central rod 111 passing through nozzle 112 which is carried by membrane 91 for movement with valve 89.

Again similarly to the valve distributors of FIG. 1, the central distributor rod 111 has a conically tapering portion 111a forming annular water feed opening 113 with the nozzle to place upstream chamber 92 in communication with counter-pressure chamber 94.

Downstream chamber 93 communicates with mixing chamber 114 through outlet ports in support plate 85, the water mixture flowing out of chamber 114 through outlet 84 in communication with the chamber.

Support plate 85, which delimits the mixing chamber in casing 81, has a port 115 coaxial with central axis X—X of the mixing device and leading to control chamber 116 defined between support plate 95 and closure 82 as well as facing bosses 100 of the two distributors. Chamber 116 receives the water mixture from the mixing chamber through port 115 and houses a bilamellar thermostatic control 117 responsive to the water temperature and operated to displace a water cut-off element 118 in response to water temperature changes. The water flow cut-off element is mounted displaceably between nozzles 119 and 121 leading respectively from the counter-pressure chambers of the two distributors into control chamber 116. Element 118 is displaced in the direction of arrows F or $F_1$, depending on whether the temperature of the water mixture in the control chamber is too high or too low. Element 118 has inclined surfaces facing nozzles 119 and 121 so that, upon axial movement of the element, the output of one nozzle is increased proportionally to the decrease in output of the other nozzle so that the respective pressures in the counter-pressure chambers of the hot and cold water distributors are controlled in response to the temperature of the water mixture.

The above-described mixing device operates in the following manner:

The water output from the mixing device is regulated by a non-illustrated cock arranged in the outlet conduit connected to outlet 84 of the mixing chamber 114.

Depending on its axial position, which is responsive to the water temperature in control chamber 116, the cut-off element 118 determines and varies the free section of outlet channels 119 and 121 from the counter-pressure chambers of the hot and cold water distributors. When element 118 is displaced in the direction of arrow $F_1$, which indicates that the water mixture temperature is too high, the flow of hot water through channel 119 of the hot water distributor C will be reduced, causing the pressure in counter-pressure chamber 94 to rise and valve 89 of this distributor to be closed, i.e., to be moved against seat 88. At the same time, the flow of cold water through channel 121 will be increased, tending to open the cold water valve.

Due to the large diameter of valve seat 88, the lift of the valve remains weak so that normal displacements of the valves have only a very small influence on the size of the feed opening into the counter-pressure chambers. However, if the delivery pressure of hot water changes for some reason, for instance if it increases, the changed or increased water pressure in upstream chamber 92 causes a retraction of central rod 111 since this pressure increase will flex membrane portion 107 inwardly into the concavity of head 104.

This pressure compensating piston action on the central rod is again functionally equivalent to that in the embodiment of FIG. 1, the tapering of conical rod section 111a causing the size of the feed opening 113 to be increased as the rod is retracted. This causes a corresponding movement of valve 89 under the changing pressure in the counter-pressure chamber until a state of equilibrium has been restored due to the displacement of the valve in respect of central rod 111.

In this manner, an increase in the delivery pressure of hot water corresponds automatically to a decrease in the valve opening so that the output of hot water remains practically unchanged regardless of the delivery pressure thereof to the mixing device, the operation of the device thus being largely independent of the water pressure in the supply system. The compensating piston arrangement 107, which controls the axial position of central rod 111, automatically corrects the effects of pressure variations in the system, without regard to the operation of thermostatic control 117 which becomes effective only if and when the water mixture produced by the device becomes too hot.

Due to this pressure compensating means in the mixing device, it will operate satisfactorily in a wide range of water delivery pressures, for instance between 0.5 and 6 atmospheres without change in the compression springs 90 which actuate the distributor valves. When the water pressure is low, the feed opening leading from the counter-pressure chamber is smaller and the valve is opened more widely. When the water pressure is high, the size of the feed opening leading from the counter-pressure chamber is larger and the valve is opened less widely. On the other hand, if the water pressure varies only in one of the distributors, the compensating effects of the axially movable central rods of the distributors automatically correct any condition of disequilibrium between the distributors.

In effect, the relative closure of the valve of the distributor fed by water under higher pressure causes, in the valve of this distributor, a loss of the extra load necessary to create equilibrium between the pressures in the downstream chambers of the two distributors.

As a result of the above-described structure common to both illustrated embodiments of this invention, the mixing device operates with a very stable temperature of discharged water even when the water delivery pressures vary greatly and differ considerably from each other. This is of particular advantage in apartment house installations where water pressures may change rapidly and considerably at individual outlets, depending on the number of such individual outlets in use at any particular time.

It would, of course, be possible to vary the embodiment of FIG. 2 by arranging the two distributors coaxially, as in the embodiment of FIG. 1, with the central rods 111 coupled together into a single element and two compensating membranes 105 acting on this single element in opposite directions.

While the invention has been described in connection with two specific embodiments, it will be clearly understood that many variations and modifications may occur to those skilled in the art, particularly after benefiting from the present teaching, without departing from the spirit and scope of this invention, as defined in the appended claims.

What is claimed is:

1. In a device for mixing hot and cold water, said device having a housing, a hot water inlet and a cold water inlet disposed to the housing, an outlet on the housing for a mixture of hot and cold water passing from said hot and cold water inlets, two upstream chambers disposed within the housing, one each in communication with the hot water inlet and the cold water inlet, two downstream chambers disposed within the housing, one each in communication with said upstream chambers, said downstream chambers disposed in communication with a hot and cold water mixing chamber within the housing, said mixing chamber being in communication with said water outlet, and a hot water distributor and cold water distributor each positioned intermediate an upstream and downstream chamber, the improvement which comprises, the hot water distributor and cold water distributor, each distributor including a valve, a membrane supporting the valve, a seat whereon the membrane supports the valve, the valve seat being arranged between an upstream chamber and a downstream chamber, the membrane delimiting a counterpressure chamber, a nozzle mounted for movement with the valve, and a tapering central rod passing through the nozzle and defining therewith a variable passage in communication with the upstream chamber and with a feed opening in the membrane for interconnecting the upstream and counterpressure chambers, said counterpressure chamber communicates with the downstream chamber through a calibrated outlet channel the central rod being axially movable, and a compensating piston mounted in the upstream chamber and biasing the rod for axial movement under the pressure in the upstream chamber.

2. In the mixing device of claim 1, the central rods of the distributors being independent of each other.

3. In the mixing device of claim 1, an outlet channel of variable section for each counter-pressure chamber, and a thermostatic device responsive to the temperature of the hot and cold water mixture controlling the outlet channel section.

4. In the mixing device of claim 1, the compensating piston being constituted by a rubber element having a hollow peripheral flange, a support element for the rubber element, the support element having a concave head, the flange being mounted on the head and the central portion of the rubber element forming a deformable membrane covering the concavity of the head, the central rod being mounted on the deformable membrane.

5. In the mixing device of claim 1, the two distributors being arranged coaxially, a single element constituting the central rods of the distributors in coaxial alignment, and the compensating pistons of the distributors biasing the rods in opposite directions.

6. In the mixing device of claim 5, comprising resilient means of opposite bias at the respective ends of the single element, and an adjustable abutment supporting at least one of the resilient means to permit modification of the axial position of the single element.

7. In the mixing device of claim 6, the housing comprises a tubular body having a bore, a faucet pipe axially movably mounted in the bore of the tubular body, a tubular core mounted fixedly in respect of the tubular body in the interior of the faucet pipe, the two distributors being positioned in the tubular core, a first operating button mounted on one end of the tubular body and operatively connected to the adjustable abutment for permitting the axial positioning of the single element in the tubular core, and a second operating button mounted at the other end of the tubular body for permitting the axial displacement of the faucet pipe to operate the pipe as a cut-off element for the hot and cold water.

8. In the mixing device of claim 7, the tubular body comprising two bearing surfaces axially adjacent the axially movable faucet pipe and the faucet pipe carrying two gaskets for sealing cooperation with the bearing surfaces, the cooperating gaskets and bearing surfaces constituting primary cut-off means at the inlet of the distributors for cutting off feeding of hot and cold water to the upstream chambers when the mixing device is in the closed position.

9. In the mixing device of claim 8, the faucet pipe and the tubular core defining respective ports adjacent each other and constituting secondary cut-off means of variable section at the outlet of the distributors, the ports being arranged to be opened upon axial displacement of the faucet pipe only after a dead stroke of the pipe sufficient to assure the prior opening of the primary cut-off means.

10. In the mixing device of claim 9, outlet channels of constant section connecting the counter-pressure chambers of the distributors with the downstream chambers thereof, the outlet channels being arranged upstream of the secondary cut-off means.

* * * * *